United States Patent [19]

Disston, Jr.

[11] 4,048,881

[45] Sept. 20, 1977

[54] TAILSTOCK POWERING DEVICE

[75] Inventor: Horace C. Disston, Jr., Cherry Hill, N.J.

[73] Assignee: Van Wood Manufacturing Co., Inc., Cherry Hill, N.J.

[21] Appl. No.: 676,691

[22] Filed: Apr. 14, 1976

[51] Int. Cl.² .................................. B23B 23/00
[52] U.S. Cl. ........................... 82/31; 51/238 R
[58] Field of Search .................. 82/31; 51/238 R

[56] References Cited

U.S. PATENT DOCUMENTS

| 1,921,502 | 8/1933 | Brill | 82/31 |
| 2,313,482 | 3/1943 | Rocks et al. | 82/31 X |
| 3,198,042 | 8/1965 | Binns | 82/31 |

FOREIGN PATENT DOCUMENTS

| 178,511 | 5/1954 | Austria | 82/31 |
| 624,372 | 6/1949 | United Kingdom | 82/31 |

Primary Examiner—Leonidas Vlachos
Attorney, Agent, or Firm—Robert K. Youtie

[57] ABSTRACT

A powering device for the tailstock of a lathe, wherein a cylinder and piston assembly is mounted on the tailstock for fluid actuation of the piston relative to the cylinder, and the piston is associated with the handwheel shaft to feed and retract the latter as desired, by fluid operating means, while the manually actuable tailstock operating means remains connected for manual actuation, as desired.

5 Claims, 3 Drawing Figures

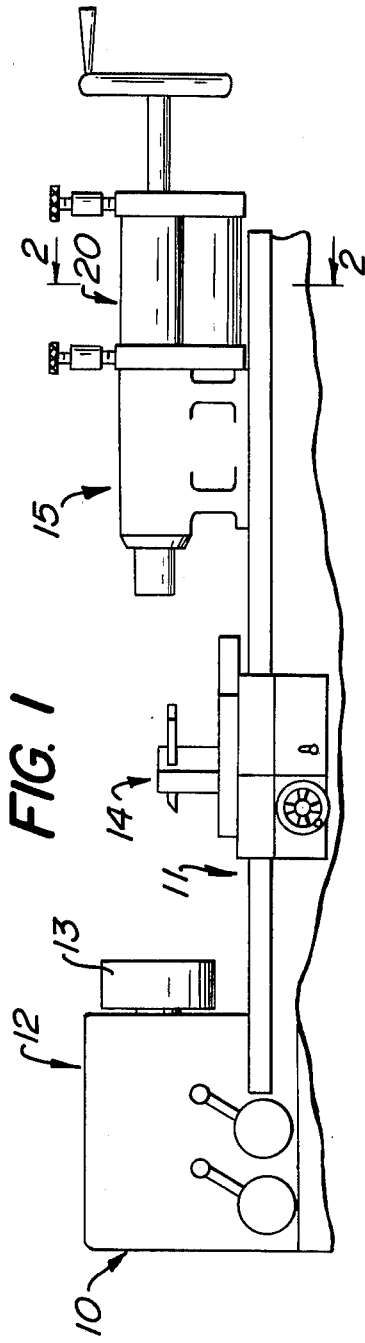
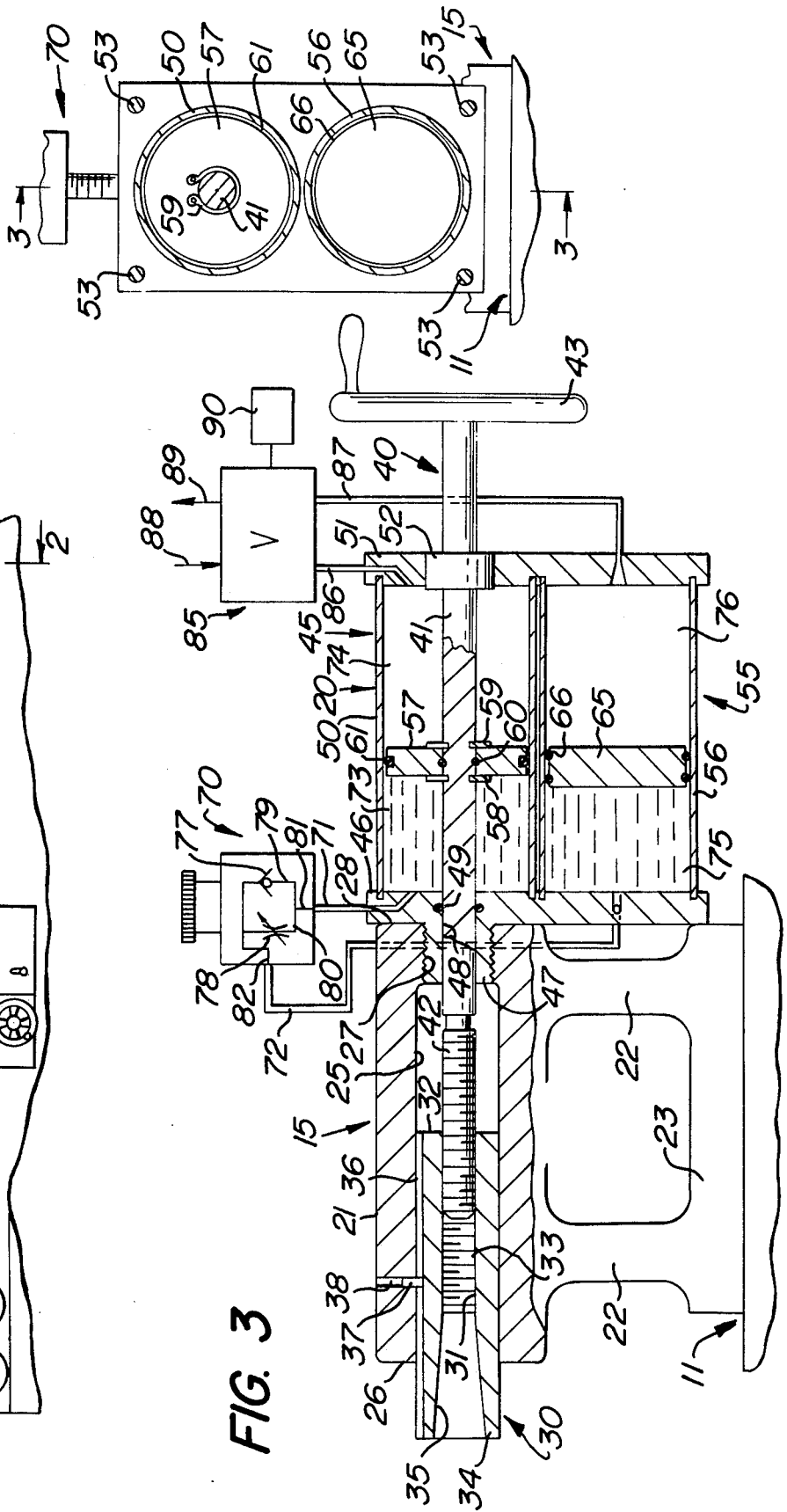

TAILSTOCK POWERING DEVICE

BACKGROUND OF THE INVENTION

As is well known to those versed in the arts of machine tools, many operations involve feeding of the tailstock, as in drilling a work piece held by a rotating chuck, and other procedures. These operations usually require manual actuation of the tailstock handwheel for controlled feeding of the tailstock tool, a time-consuming, tedious and expensive procedure. Additionally, it is presently conventional procedure to retract or return the tailstock carried tool manually by these same tedious and time-consuming lead screw operation. Also, tool pressure upon the work must be exerted manually by the operator causing rapid fatigue.

SUMMARY OF THE INVENTION

Accordingly, it is an important object of the present invention to provide a tailstock powering device which overcomes the above-mentioned difficulties, achieves any desired rate of feed toward the work by a mere valve setting, provides relatively rapid retraction or return of the work also by a mere valve setting, and is capable of exerting consistant tool pressure against the work, which pressure may be relatively high if desired, without effort by the operator.

It is another object of the present invention to provide a tailstock powering device or apparatus having the advantageous characteristics mentioned in the preceding paragraph, which is extremely simple in construction, durable and reliable throughout a long useful life, well adapted for use with existing and newly manufactured equipment, and which does not alter the conventional handwheel function, so that manual tailstock operation may be performed when desired.

Other objects of the present invention will become apparent upon reading the following specification and referring to the accompanying drawings, which form a material part of this disclosure.

The invention accordingly consists in the features of construction, combinations of elements, and arrangement of parts, which will be exemplified in the construction hereinafter described, and of which the scope will be indicated by the appended claims.

BRIEF DESCRIPTION OF THE DRAWINGS

FIG. 1 is a side elevational view showing a lathe having incorporated therein a tailstock powering device constructed in accordance with the teachings of the present invention.

FIG. 2 is a transverse sectional elevational view taken generally along the line 2—2 of FIG. 1.

FIG. 3 is a longitudinal sectional elevational view taken generally along the line 3—3 of FIG. 2, including diagrammatic representation of a fluid operating system.

DESCRIPTION OF THE PREFERRED EMBODIMENT

Referring now more particularly to the drawings, and specifically to FIG. 1 thereof, a lathe is there generally designated 10, including a bed 11, at one end of which is provided a headstock 12 carrying a rotary chuck 13 over the bed. A tool carriage is generally designated 14, being movable along the bed or ways 11. In addition, mounted on the bed for selective positioning therealong is a tailstock 15. As thus far described, the lathe 10 may be generally conventional. However, in addition to the conventional lathe components, there is provided in accordance with the teachings of the instant invention a tailstock powering apparatus generally designated 20.

The tailstock 15 and powering apparatus 20 are best seen in FIGS. 2 and 3. The tailstock 15 may include a housing 21 upstanding on legs 22 from a base or foot 23 shiftable on the bed or ways 11. The base 23 may be releasably secured to the bed 11 by any suitable means.

The housing 15 is provided with a hollow interior or bore 25, which may be of generally cylindrical internal configuration opening through one end 26 of the housing toward the headstock 12. An internally threaded passageway or hole 27 may be provided in the housing 21 opening from the inner end of the bore 25, generally coaxially thereof, outwardly through the outer housing end 28 remote from the headstock.

A generally cylindrical quill or carrier 30 may be slidably received in bore 25 of housing 21, the carrier having a longitudinally extending, generally coaxial through passageway or bore 31. The internal carrier passageway 31 is internally threaded from the inner carrier end 32 to an intermediate location, as at 33; and, the carrier passageway 31 extends from the outer end 34 in a tapered configuration 35 terminating at the threaded part 33. The internal taper 35 of carrier passageway 31 is adapted to grip, in the conventional manner, tools, such as drills, and the like.

A longitudinally extending, external groove 36 is formed in the outer surface of the carrier 30, opening through opposite carrier ends 32 and 34, and slidably receives a transverse pin 37 extending from a generally radial hole 38 in the housing 21 into the groove. Thus, the pin-in-groove connection 37, 36 constrains the quill or carrier 30 to pure longitudinal shifting movement in the tailstock housing 21 for extension and retraction with respect to the housing end 26.

A manual actuating shaft is generally designated 40, and includes an elongate rod or shaft portion 41 extending inwardly through the tailstock housing hole 27. On the inner end of shaft 40, interiorly of the housing bore 25, is a threaded shaft portion 42 extending into threaded engagement within the threaded passageway portion 33 of carrier or quill 30. Manual actuating means 43 may be provided on the outer end of actuating shaft 40, say in the form of a handwheel. As thus far described, the tailstock structure may be generally conventional.

In accordance with the teachings of the instant invention, the tailstock powering apparatus 20 is fixedly mounted to the tailstock housing 21. In particular, a primary cylinder is generally designated 45 and is mounted on the rearward or outward end of tailstock housing 21, generally coaxially with the tailstock bore 25, the carrier 30 and shaft 40. The primary cylinder 45 includes an inner wall or end plate 46 having an externally threaded mounting extension 47 for threaded engagement into the housing hole 27. By this, or other suitable means, the cylinder end plate 46 may be secured fast to the tailstock housing 21. The end plate 46 and mounting extension 47 are provided with a through opening or bore 48 rotatably and slidably receiving the rod like shaft portion 41. Suitable sealing means, as at 49, may be provided in the bore 48 in sliding sealing engagement with the received shaft part 41.

The primary cylinder 45 further includes a cylinder shell or open-ended tube 50 in spaced coaxial surrounding relation with the shaft part 41, having one end in closed engagement with the inner cylinder end wal 46. An outer cylinder end wall 51 is in closing engagment with the outer end of cylindrical cylinder side wall of shell 50 to close the latter. The outer cylinder end wall 51 also receives the shaft part 41 in sliding sealing engagement therewith, as by suitable sealed journal means 52.

The cylinder end plates 46 and 51 may extend in one direction considerably beyond the primary cylinder side wall 50, say downwardly beyond the latter as illustrated. Retaining the cylinder end walls 46 and 51 in their end closing relation with the cylinder side wall 50 may be a plurality of fasteners or tie rods 53, say arranged in a rectangular configuration and each extending between adjacent portions of the end plates.

The power apparatus further includes an auxiliary cylinder, generally designated 55, which may be composed of a generally cylindrical, open-ended tubular member or side wall 56, which also extends between and has its opposite ends closed by respective cylinder end members 46 and 51. Thus, the secondary cylinder 55 may generally be in adjacent parallelism with the primary cylinder 45.

Interiorly of the primary cylinder 45, extending across the cylinder is a piston 57 which coaxially receives and is carried by the rod part 41 of shaft 40. The piston 57 is retained against longitudinal movement along the shaft part 41 by any suitable means, such as retaining means or rings 58 and 59, and is maintained in sealed relation with the shaft part 41 and cylinder wall 50 by espective seals 60 and 61. Thus, the primary piston 57 is carried by the shaft part 41 for movement with the shaft upon longitudinal shaft movement. However, the piston and shaft may have relative rotative movement without adversely affecting operation.

Extending across the interior of auxiliary or secondary cylinder 55 is a piston 65 which may be freely slidable in the secondary cylinder side wall 56, being suitably sealed relative thereto, as by sealing means 66.

Fluid operating means is associated with the tailstock powering means 20, including valve means 70 communicating through line or conduit 71 with the interior of primary cylinder 45, and communicating through conduit or line 72 with the interior of secondary cylinder 55. More specifically, the interior of primary cylinder 45 is subdivided by piston 57 into a primary cylinder chamber 73 on one side of the piston, and a primary cylinder chamber 74 on the other side of the piston; and, the conduit or line 71 communicates between valve means 70 and the chamber 73 of cylinder 45. Similarly, the cylinder 55 is subdivided by piston 65 into a chamber 75 on one side of the piston and a chamber 76 on the other side of the piston; and, the conduit or line 72 communicates between valve means 70 and the chamber 75. The valve means 70 includes a pair of valves 77 and 78 connected in parallel fluid communication with each other, as by fluid lines 79 and 80. The vave 77 may be a one-way or check valve, and the valve 78 may be an adjustable or metering valve. The parallel fluid conduits or lines 79 and 80 may be joined together at one end and connected in fluid communication, as at 81, to the conduit ot line 71. The other ends of the parallel fluid conduits 79 and 80 may be connected together to a conduit 82, which may be connected to the fluid line or conduit 72.

The fluid system including chamber 73, conduit 71, valve means 70, conduit 72 and chamber 75 may be filled with hydraulic or incompressible fluid. Upon the leftward shifting movement of piston 57, the hydraulic fluid in chamber 73 will be pressurized and flow through conduits 71, 81 and 80, metering valve 78, nd conduits 82 and 72 into chamber 75 to displace piston 65 rightward. The rate of such flow, and the consequent rate of shifting movement of piston 57, shaft 40 and carrier 30 may be effectively controlled by adjustment of metering valve 78. Of course, one-way valve 77 will be closed in the above-described operating condition. Upon reversal, as by leftward movement of piston 65, the incompressible fluid will be caused to pass from chamber 75, through conduits 72 and 82, one-way valve 77, and conduits 79, 81 and 71 into chamber 73 to shift piston 57 rightward. This effects withdrawal or retraction of shaft 40 and carrier 30, and may be relatively quickly accomplished by free flow of fluid through valve 77. Of course, fluid may also return through metering valve 78, but the greater part of flow would be through valve 77 for quick return.

The fluid operating system further includes additional valve means generally designated 85, which may be of a reversing type being connected on one side to cylinder chambers 74 and 76 by respective fluid conduits or lines 86 and 87, and connected on its other side by respective fluid conduits or lines 88 and 89 to a fluid pressure souce and a fluid pressure exhaust (not shown). Manual actuating means are diagramatically indicated at 90 for selectively connecting the fluid pressure inlet line to one of conduits 86 and 87 and the outlet line 89 to the other of said conduits. Thus, fluid pressure, such as readily convenient pneumatic pressure, may be communicated through valve means 85 to cylinder chamber 74, while cylinder chamber 76 is communicated to exhaust. In this manner, the piston 57 is shifted leftward to effect feeding of tool carrier 30, as described hereinbefore. Mere reversal of valve means 85 will apply pressurized fluid through conduit 87 to cylinder chamber 76, and communicates cylinder chamber 74 to exhaust, for reversal of the above-described operation and withdrawal or retraction of tool carrier 30.

If it is desired to employ the manual actuating means or handwheel 43, it is only necessary to position the piston 57 and shaft 40 against longitudinal shifting movement. For example, this may be done by shifting the piston 57 into abutting engagement with either one of cylinder end walls 46 or 51, as by properly applied fluid pressure. Rotation of handwheel 43 will then effect rotative threaded engagement between shaft threaded portion 42 and carrier threaded portion 33, for longitudinally shifting the carrier 30 inwardly or outwardly, according to the direction of shaft rotation.

From the foregoing, it is seen that the present invention provides a tailstock powering apparatus which can be readily incorporated in an existing tailstock, or in original equipment, permits of extremely simplified operation by merely operating a valve, provides a steady and fully adjustable feed with any desired drill pressure, as well as rapid return, without losing conventional handwheel operating function, and which otherwise fully accomplishes its intended objects.

What is claimed is:

1. A tailstock power device for a tailstock having a housing selectively positionable on a bed, a carrier mounted in said housing for longitudinal shifting extensile and retractile movement with respect to said housing, and an actuating shaft threadedly engaged with said carrier in said housing and extending exteriorly there-from for threaded rotation relative to said carrier and shifting movement therewith, said device comprising: a first cylinder for mounting on said housing and surrounding said shaft with the latter extending in slidable and rotatable sealed relation through said cylinder, a first piston shiftable in said first cylinder and connected to said shaft for shifting movement with said shaft and carrier, fluid operating means selectively communicable with said cylinder to drive said piston is a desired direction for selective movement and positioning of said shaft and carrier, said shaft being rotatable upon fixed positioning of said piston in threaded engagement with said carrier to shift the latter, a second cylinder, a second piston shiftable in said second cylinder, and fluid operating means comprising a source of pressure fluid selectively communicable with said first mentioned cylinder on one side of sad first mentioned piston to feed said carrier and selectively communicable with said second cylinder on one side of said second piston to feed the latter, metering means communicable between said first mentioned cylinder on the other side of said first mentioned piston and said second cylinder on the other side of said second piston to meter fluid passing therebetween upon feeding of said carrier, and one-way valve means communicable in the direction between said second cylinder on said other side of said second piston and said first cylinder on said other side of said first piston, for rapidly returning metered fluid and consequently rapidly returning of said carrier.

2. A tailstock powering device according to claim 1 said first cylinder coaxially surrounding said shaft, and said first piston coaxially receiving said shaft in sealing rotative relation.

3. A tailstock powering device according to claim 1, in combination with manually actuable rotating means on said shaft.

4. A tailstock powering device according to claim 1, in combination with threaded mounting means on said first cylinder for threaded mounting fast to said housing.

5. A tailstock powering device according to claim 4, said mounting means, first cylinder and piston being coaxial with said shaft.

* * * * *